United States Patent [19]

Meeske et al.

[11] 4,166,054

[45] Aug. 28, 1979

[54] WATER DISPERSIBLE EPOXY RESIN COPOLYMERS AND METHOD OF MAKING THE SAME

[75] Inventors: Charles J. Meeske, Birmingham; Enrique H. Van der Tuin, Royal Oak; Michael J. Racey, Mt. Clemens, all of Mich.

[73] Assignee: Reichhold Chemicals, Inc., White Plains, N.Y.

[21] Appl. No.: 875,548

[22] Filed: Feb. 6, 1978

Related U.S. Application Data

[63] Continuation of Ser. No. 661,141, Feb. 25, 1976, abandoned.

[51] Int. Cl.$^2$ .............................................. C09D 3/58
[52] U.S. Cl. ............................ 260/23 EP; 260/18 EP; 260/21
[58] Field of Search .................... 260/18 EP, 23 EP

[56] References Cited

U.S. PATENT DOCUMENTS

| | | | |
|---|---|---|---|
| 2,877,195 | 3/1959 | McNabb | 260/23 EP |
| 3,183,198 | 5/1965 | Wagner | 260/18 EP |
| 3,251,790 | 5/1966 | Christenson et al. | 260/18 EP |
| 3,305,501 | 2/1967 | Spalding | 260/18 EP |
| 3,536,641 | 10/1970 | Sekmakas et al. | 260/21 |
| 3,563,929 | 2/1971 | Guldenpfennig | 260/23 EP |
| 3,663,487 | 5/1972 | Broecker | 260/23 EP |
| 3,707,516 | 12/1972 | Walus | 260/21 |

Primary Examiner—Ronald W. Griffin

[57] ABSTRACT

An air curable resin solution useful for surface coating and impregnation comprising (I) the reaction product of (A) from about 50% to about 65% by weight based upon the total weight of (A) and (B) of an epoxy resin ester of a partially conjugated unsaturated fatty acid and (B) from about 50% to about 35% by weight based upon the total weight of (A) and (B) of a blend of reactive monomer possessing reactive double bonds, at least one of which must be an unsaturated mono-basic acid in the presence of (II) an alcohol ether of a glycol and subsequently reacted with (III) an amine and then (IV) dispersed in water, wherein component (A) is the reaction product of 2,2,bis(4 hydroxy phenyl) dimethyl methane and epichlorohydrin, and has a melting point from about 130° F. to about 230° F. and an epoxide equivalent weight within the range from about 400 to about 1100, and the fatty acids used are straight chain monobasic acids of 18 carbon length having double bonds arranged in the chain in amount and position to give an iodine number of 125 to 185, an acid number of from about 180 to 210 and a percentage of conjugation of the double bonds between 20% and 25% wherein the reaction is carried out to an acid number below 10 and the monomer (B) portion consists of a mixture of 20–28% of unsaturated monobasic acids having a polymerizable double bond and 80% to 72% reactive monomers having a polymerizable double bond.

17 Claims, No Drawings

WATER DISPERSIBLE EPOXY RESIN COPOLYMERS AND METHOD OF MAKING THE SAME

This is a continuation of application Ser. No. 661,141, filed Feb. 25, 1976, now abandoned.

This invention relates to improved water dilutible epoxy resin copolymers and, in particular, those resins having application in surface coatings.

The replacement of organic solvents with water in surface coatings has become a prime interest of surface coating producers and applicators.

The major reasons for using water as the solvent are: (1) to reduce the danger of fire due to the extremely flammable solvent vapors released during application of coatings by spray, flow coat and dip processes, (2) to reduce the great expense of eliminating the vapors of organic solvents from reaching the atmosphere and causing air pollution, (3) to reduce the consumption of solvents based on petroleum of the decreasing petroleum available and the increasing costs of petroleum based products.

It is an object of the present invention to provide an epoxy resin copolymer suitable for chemical coating compositions that may be water-thinned.

A further object of the invention is to provide a resin that has low explosive or fire hazards attended with its use.

A further object of the invention is to provide a resin that will produce chemical coating compositions that can be applied with sufficiently low emission of vapors to meet governmental air pollution requirements.

A further object of the invention is to provide a resin that will eliminate the use of aliphatic and aromatic solvents.

These and other objects will be evident from the following specifications and claims appended thereto.

It has been demonstrated through large scale commercial use that epoxy resin esters produce excellent vehicles for surface coatings due to their exceptional adhesion properties, toughness and salt spray resistance.

An epoxy resin ester is defined in this application as an ester of an epoxy resin with a drying oil fatty acid.

These desirable esters have, however, required the use of aromatic solvents such as xylene which is: (1) inflammable, (2) based on petroleum and (3) considered to be a major smog producing chemical.

There are several manners in which an epoxy ester can be modified to make it soluble in water.

(1) It can be made emulsifiable by adding an emulsifying agent which is a compound which alters the surface tension of the water to stabilize a dispersion of very small particle size globules of resin in water. This method is deficient in that it is difficult to obtain stability of the emulsion, the emulsion is slow in drying because the emulsifying agent stays in the film and softens it and, because the emulsifying agent stays in the film, it causes sensitivity of the dryed film to humidity and water.

(2) A second manner (described in U.S. Pat. No. 3,251,790) is to react the epoxy ester with maleic anhydride or fumaric acid to add carboxyl groups which then can be neutralized with an amine to produce a water dilutible resin. This type of epoxy ester, referred to as a maleinized epoxy ester, does not cure well because there is no crosslinking in the film other than that due to the double bonds in the fatty acid. No free epoxy groups may be present in the ester because they will react with the maleic anhydride and cause the resin to gel. Furthermore, no epoxy groups are left to react in the film with the carboxyl groups after the amine is evaporated. The reaction with maleic or fumaric also consumes many of the double bonds in the fatty acid leaving less to perform a drying function.

(3) A third manner (described in U.S. Pat. No. 3,305,501) is to react maleic anhydride (or fumaric acid) with an unsaturated fatty acid such as linseed fatty acid, dehydrated castor oil fatty acid or conjugated tall oil fatty acids and then react this product about 130° C. to about 140° C. with an epoxy resin.

This partially esterified ester is then neutralized in a water/amine solution to become water soluble. This composition will cure to a tough film if baked at about 150° C. to about 175° C. One drawback of this method is the great danger of gelation during the esterification step and the need for baking the film in order for it to cure.

In contradistinction, our invention does not require baking and the reaction is easy to control in order to obtain a uniform polymer.

Simply, our invention differs from the prior art methods in that it attains its water dilutibility from the presence of carboxyl groups supplied by a mono basic organic acid which has a reactive double bond and is incorporated into the film through the double bonds present in the conjugated fatty acid of the ester as a copolymer with other reactive monomers. The copolymer also adds hardness and drying capacity to the film and increases its resistance to humidity and salt spray.

The copolymer can be varied to achieve harder or softer films.

Specifically, the present invention relates to a water soluble or dilutible amine salt of an epoxy ester copolymer which serves as a component for a surface coating which can be pigmented. In a preferred embodiment, our invention comprises (A) an epoxy resin which is a reaction product of 2,2,bis(4 hydroxy phenyl)dimethyl methane and epichlorohydrin having an epoxide equivalent value of 450–525, a melting point of 65° C.–75° C. and a viscosity of E-J in a test solution at 40% non-volatile in monobutylether of diethylene glycol; which is esterified with a drying oil fatty acid having an acid number of 190–200 and an iodine value between 125 and 185, preferably having a minimum of 20% of its double bonds in a conjugated configuration; the esterification is continued to an acid number below 10.0 and is then dissolved in a solvent which is an ether of a short chain alcohol and ethylene glycol to 60% non-volatile which solution has a viscosity of K-N (Gardner-Holdt).

The 60% non-volatile solution of epoxy ester (A) is reacted with (B) a mixture of unsaturated monomers, 25% of which must consist of an unsaturated monobasic acid.

The copolymer of (A) and (B) will be a 70% non-volatile solution with a viscosity of $Z_5$-$Z_7$ and an acid number of 35–45 which, after addition of an amine compound to adjust the pH to a range of about 6 to 9, will be dilutible with water and, when applied as a thin film, will cure at room temperature to a hard glossy water resistant film.

The following is a detailed description of the components useful in the practice of this invention:

(1) epoxy resins, (2) fatty acids, (3) solvents (4) reactive monomers and (5) amines which may be used to prepare the copolymers of our invention.

(1) Epoxy resins are well known in the art and have large commercial usage.

The epoxy resins which we use in our invention are the reaction products of 2,2,bis(4 hydroxy phenyl)-dimethyl methane and epichlorohydrin. In our invention, the resins can range in melting point from about 130° F. to about 230° F. and epoxide equivalent weight may range from about 400 to about 1100.

Some typical commercially available epoxy resins usable in our invention are Reichhold Chemicals, Inc.'s Epotuf 37-301, Dow Chemical's DER-661, Shell Chemical's Epon 1001 and Ciba Chemical's Araldite 6071. All these resins have an epoxide equivalent weight of about 425 to about 550 and a softening point of about 140° F. to about 170° F. These are the preferred resins. Higher molecular weight usable resins are Reichhold Chemicals, Inc.'s Epotuf 37-302, Dow Chemical's DER-662, Shell Chemical's Epon 1007 and Ciba Chemical's Araldite 7072 with an epoxide equivalent weight of about 550 to about 750 and a softening point of from about 167° F. to about 190° F. At an even higher molecular weight range, usable resins are Reichhold Chemicals, Inc.'s Epotuf 37-304, Dow Chemical's DER-664, Shell Chemical's Epon 1004 and Ciba Chemical's Araldite 6084, all having an epoxide equivalent weight of about 825 to about 1025 and a softening point of from 200° F. to about 221° F.

(2) The fatty acids used in this invention are straight chain mono basic acids of 18 carbon length having double bonds arranged in the chain in amount and position to give an iodine number of 125 to 185 an acid number of from about 180 to 210 and a percentage of conjugation of the double bonds between 20% and 25%. Such fatty acids are available from dehydrated castor oil, conjugated safflower oil, conjugated tall oil fatty acids or mixtures of china wood oil or oiticica oil fatty acids with non-conjugated fatty acids.

Components (1), the epoxy resin and (2) the fatty acid are reacted at about 220° C. to about 240° C. to form an epoxy ester identified as the (A) portion of the invention. The reaction is continued to an acid number of below 10 and then dissolved in a solvent of a glycol either at 60% N.V. have a viscosity of K to N (Gardner-Holdt).

The ratio of fatty acids to epoxy resin can vary from between 40% to 60% by weight and the epoxy resin from 60% to 40% by weight.

(3) The solvents can be methyl, ethyl, propyl or butyl alcohol ether of glycols such as ethylene, propylene, diethylene or dipropylene. However, the preferred solvents are the butyl ether of ethylene glycol or the ethyl ether of ethylene glycol. Other solvents that are soluble in water may be used. The solvent must not inhibit the copolymerization of the (B) portion with the (A) portion of the invention and the boiling range of the solvent is preferably above 120° C. to facilitate the co-polymerization reaction but may be lower. These solvents are also used to adjust the non-volatile of the finished resin solution. The amount of solvent used may vary depending upon the non-volatile content desired for the finished resin solution. Generally, the non-volatile portion of the finished resin solution is about 60% to about 70%, but this may vary depending upon the application.

The reactive monomers, the (B) portion of the invention that are copolymerized with the epoxy ester solution, the (A) portion, must consist of a mixture of 20-28% of a mono basic acid having a polymerizible double bond, preferably acrylic acid or methacrylic acid and 72% to 80% of monomers such as styrene, vinyl toluene, methyl, ethyl, propyl, butyl or isobutyl methacrylate or methyl, ethyl, propyl, butyl, isobutyl or 2-ethylhexyl acrylate, either separately or in various mixtures. Other monomers can be used if they will copolymerize with the mono basic acid in solution.

The ratio of the (A) portion to the (B) portion may range from about 50% to about 65% by weight based upon the total weight of (A) and (B) used for the (A) portion and from 35% to about 50% by weight based upon the total weight of (A) and (B) used for the (B) portion. The preferred ratio is about 60% by weight of (A) and about 40% by weight of (B).

A peroxide catalyst is necessary to carry out the copolymerization at a temperature range of about 120° C. to about 150° C. The preferred catalyst is ditertiary butyl peroxide, but other peroxides may be used such as benzoyl peroxide, cumene hydroperoxide, tertiary butyl perbenzoate and tertiary butyl hydroperoxide among others. From about 1% to about 6% by weight (based upon the weight of (B) used of the catalyst) may be used.

The copolymer solution is neutralized with an amine to a pH of from about 5 to about 9 to make it water dilutible.

A great number of amines may be used but some are preferred because of outstanding properties which they contribute to the stability of the solution and to the film properties such as drying speed, color and water resistance.

Ammonia and triethyl amine are preferred because they evaporate rapidly which is desirable for air dried films.

Dimethyl or diethyl ethanol amines give maximum stability and evaporate slowly, therefore, making these useful for dip tank or flow coat applications. However, the resulting film must be baked to complete drying.

Monoisopropanol or ethanol amine are also suitable for preparing baked films.

The amine should be chosen on the requirements of the surface coating application method, curing method and film properties desired.

The epoxy resin ester copolymers of this invention are suitable for the production of both air dry and baking type protective surface coatings.

The copolymers are first made water reducible through the addition of an amine and then water is added to bring the non-volatile portion to the content desired; usually about 30% non-volatile. This resin solution is then suitable as a coating or may be further compounded through the addition of fillers and colorants commonly used in the paint and lacquer industry.

These filling and coloring materials may include conventional components fillers, such as talcum, clays, carbonates, metal oxides, asbestos powder, quartz powder, chalk, dolomite, kieselguhr, heavy spar and mixtures thereof.

For coloring the mixture according to the present invention, it is possible to use dyes and/or inorganic pigments. For this purpose, fundamentally all the compounds commonly used in the paint and lacquer industry are suitable so far as they have no detrimental effect on the storage stability of the present mixtures. Illustrative digest pigments suitable for this purpose are set forth for example in *Organic Protective Coatings*, Reinhold Publishing Corporation, 1953, pages 155–166 inclusive.

The invention will be more readily understood by referring to the following specific examples, which are intended as illustrative of the invention rather than as limiting the invention to the specific details set forth therein.

In the examples, the parts are expressed by weight unless otherwise specified:

EXAMPLE I

Part (A)

450 Parts by weight of epoxy resin (Reichhold Chemicals, Inc.'s Epotuf 37-301) having an epoxy equivalent weight of 425–550 are loaded into a three-necked Pyrex glass flask equipped with an agitator, thermometer, inert gas tube and vapor outlet. 550 parts of a fatty acid having 22% conjugated linoleic fatty acid, 60% unconjugated linoleic acid and 18% oleic acid are added to the flask and heated in four hours to 230° C. with a slow flow of inert gas and agitation.

The batch is held at about 230° C. until the acid number is below 10 and then thinned to 60% non-volatile in butyl ether of ethylene glycol. The solution has a viscosity of L-N (Gardner-Holdt).

1000 Grams of (A), the 60% N.V. epoxy ester solution, are put into a three-necked flask equipped with an agitator, water cooled reflux condenser and thermometer and heated to about 135° C. to 140° C.

415 Parts of Part (B), a mixture of 304 parts of styrene monomer and 96 parts of methacrylic acid and 15 parts of ditertiary butyl peroxide, are added to the flask over a two hour period.

The batch is heated at about 135° C. to 140° C. until a viscosity of $Z_6$–$Z_7$ at 70% non-volatile is obtained. About 6 hours is required.

To produce a water soluble resin solution, 4 parts of dimethyl ethanolamine are added for each 100 parts of the resin solution to attain a pH of about 8.0–8.7.

Water is then added to obtain a 30% non-volatile solution with a viscosity of J-M (Gardner-Holdt).

A film of this resin, when baked at 350° C. for 15 minutes, is hard, glossy and has excellent humidity and salt spray resistance.

To produce a film that will dry without baking, 4 parts of triethylamine are added to 100 parts of the resin solution to obtain a pH of about 8.0 to 9.0. Water is then added to obtain a 30% non-volatile solution with a viscosity of F-H (Gardner-Holdt). A film of this resin solution will air dry to a tack-free surface in about one hour and, after 48 hours, will have a Sward hardness of 18.

EXAMPLE II

1000 Parts of Part (A) of Example I are loaded into a flask equipped with an agitator, reflux condenser and thermometer and heated to about 140° C. Then 415 parts of a mixture of 15 parts of ditertiary butyl peroxide, 96 parts of methacrylic acid, 76 parts of methyl methacrylate, 76 parts of 2-ethyl hexyl acrylate and 152 parts of styrene monomer are added over a two hour period. The reaction is continued at about 140° C. for about 6 hours until the viscosity is in the $Z_6$–$Z_7$ range at 70% N.V.

To form a water dilutible resin solution, 4 grams of dimethyl ethanolamine are added for each 100 grams of the resin solution and diluted with water to 30% N.V. The film of this solution is hard, glossy and resistant to salt spray and humidity after baking at 350° F. for 15 minutes.

When neutralized with triethylamine instead of dimethylethanolamine, the film will air dry in 1½ hours and have a Sward hardness of 16 in 48 hours.

EXAMPLE III

In the same manner as Examples I and II, to 1000 parts of (A), the epoxy ester solutions added a mixture of 15 parts of ditertiary butyl peroxide, 96 parts of methacrylic acid, 101 parts of styrene monomer, 101 parts of 2-ethyl hexyl acrylate and 101 parts of methyl methacrylate monomer over a two hour period while heating to about 135° C. to 140° C. Heating is continued at about 135° C. for 6 more hours. The resin solution will have a viscosity of $Z_6$–$Z_7$ and a non-volatile content of 70%.

To form a water dilutible solution, 4 grams of triethylamine and added to 100 grams of the resin solution and water is added to obtain a non-volatile content of 30%. A film cast at one mil of this water solution will air dry in 2½ hours to a tack-free condition and have a Sward harndess of 14 in 48 hours.

EXAMPLE IV

The epoxy ester is prepared as in Example I, Part (A), but the butyl ether of ethylene glycol is replaced by the ethyl ether of ethylene glycol as the solvent. Part (B) is prepared in the same manner as in Example 1 but the monomer mixture which is added to 1000 parts of the epoxy ester solution consists of 96 parts of methacrylic acid, 182 parts of styrene monomer and 122 parts of 2-ethyl hexyl acrylate monomer added over a 2 hour period at a temperature of between 135° C. and 140° C. The reaction is continued for about 6 hours.

The resulting resin copolymer solution at 70% non-volatile in ethyl ether of ethylene glycol solvent has a viscosity of $Z_5$–$Z_6$.

When 100 parts of this resin solution are neutralized with 4 parts of triethylamine and reduced with water to 30% non-volatile, it gives a stable dispersion in water that when cast in a film, will air dry to a hard glossy film.

EXAMPLE V

1000 Parts of Part (A) from Example I are copolymerized in the same manner with Part (B) but the mixture of monomers used in this Example V are 96 parts of methacrylic acid, 152 parts of methyl methacrylate and 152 parts of 2-ethyl hexyl acrylate.

The resulting copolymer solution in butyl ether of ethylene glycol was 70% non-volatile and $Z_6$–$Z_7$ viscosity.

100 Parts of this solution were neutralized with 4 parts of 28% ammonium hydroxide to a pH of 8 and diluted to 30% non-volatile with water. The film of this solution air dried to a hard tack-free film.

EXAMPLE VI

The copolymer solution is made in exactly the same manner as in Example I but the styrene monomer is replaced with a similar amount of vinyl toluene monomer and the resulting copolymer solution is neutralized with triethylamine and reduced to 30% non-volatile with water.

A film of this solution formed a hard tack-free film, when baked at 350° F. for 15 minutes and will also air dry at room temperature to a hard, tack-free film.

EXAMPLE VII

An epoxy ester is prepared in exactly the same manner as in Example I but the ratio of epoxy resin to fatty acids in this Example is 55% epoxy resin to 45% fatty acid instead of 45% epoxy resin and 55% fatty acid as in Example I. Part (A) has an S viscosity at 60% non-volatile in butyl ether of ethylene glycol and is reacted in exactly the same manner with Part (B) as in Example I. The resulting 70% non-volatile resin solution had a viscosity of $Z_6$-$Z_7$ and when neutralized with amine and reduced with water gave a solution and film properties comparable to Example I.

EXAMPLE VIII

To 1000 parts of Part (A) as prepared in Example I, a mixture of monomers, Part (B) are added in the same manner as of Example I but the monomer mixture is 100 parts of methacrylic acid, 200 parts of styrene monomer and 100 parts of hydroxypropyl methacrylate.

The copolymer had a viscosity of $Z_6$-$Z_7$ at 70% non-volatile in butyl ether of ethylene glycol. The acid number of the non-volatile resin was 58 and the hydroxyl number was 84. When neutralized with 3.5 parts of dimethyl ethanolamine, the pH was about 7.5 and when reduced to 30% N.V with water, the viscosity was "R". A film of this resin solution would not air dry but did bake at 350° F. for 15 minutes to a hard tough film.

EXAMPLE IX

A white air dry enamel was prepared in the following manner:
Titanium Dioxide Pigment—147 parts
Resin solution from Example I—147 parts
These were dispersed in a Cowles mixer at 2000 R.P.M. for about 10 minutes. The mixer was set to slow agitation and the following was added:
Resin from Example I—168.0 parts
Triethylamine—19.0 parts
Dimethylethanolamine—
6% Cobalt Naphthenate Drier—1.8 parts
6% Manganese Naphthenate—1.1 parts
24% Lead Naphthenate—4.6 parts
Mix well and add:
Water—459 parts The enamel has 39% non-volatile with 40% pigment by weight based on the non-volatile portion and has a viscosity of 35 seconds on a #4 Ford cup at 77° F.

A film of ½ to 1½ mils thickness will be tack-free in 45 to 60 minutes and, after air drying for 18 hours, will have a Sward hardness of 18. The gloss on a 60° meter will be 95 and on a 20° meter will measure 80. A 1.2 mil film on a metal surface treated with #37 Bonderite will be satisfactory after 500 hours exposure to a salt spray.

EXAMPLE X

A baking is prepared in the same manner as Example IX but with the following ingredients:
Titanium Dioxide Pigment—154.0 parts
Resin solution from Example I—154.0 parts
These were dispersed in a Cowles mixer at 2000 R.P.M. for about 10 minutes, the mixer was set to slow agitation and slow the mixer and add:
Resin solution from Example I—127.0 parts
Dimethylethanolamine—15.0 parts
24% Lead Naphthenate—2.3 parts
Methylated melamine resin (88% N.V.)—44.0 parts
were added and mixed well. Then mix well and add:
Water—462.0 parts
was added to obtain an enamel of 40% non-volatile.

The enamel will contain 40% pigment based upon the non-volatile portion. The viscosity will be 26 seconds on a #4 Ford cup at 77° F. After baking 30 minutes at 300° F., the film will have a Sward hardness of 44% and the gloss will measure 95 on a 60° meter and 72 on a 20° meter. The film at 1.2 mils thickness on a metal surface treated with a #37 Bonderite treatment will withstand 500 hours salt spray.

EXAMPLE XI

An air dry grey primer was prepared in the following manner:
Titanium Dioxide Pigment—85.0 parts
Iron Oxide black—2.5 parts
Clay—69.0 parts
Fine particle size Calcium Carbonate—69.0 parts
Lead Silica Chromate—37.0 parts
Resin solution from Example I—174.0 parts
These were dispersed for 10 minutes at 2000 R.P.M. in a Cowles mixer. The mixer was slowed and
Resin solution from Example I—210.0 parts
Triethylamine—18.0 parts
6% Cobalt Naphthenate—1.7 parts
6% Manganese Naphthenate—1.0 parts
24% Lead Naphthenate—4.3 parts
were added. These were mixed well and
Water—354.0 parts
was added.

The grey primer will have a non-volatile content of 52.2% and have 49% pigment based upon the non-volatile content. An air dried film on untreated cold rolled steel will pass a 300 hour salt spray test and a 300 hour humidity test.

What is claimed is:

1. An air curable resin solution useful for surface coating and impregnation comprising (I) the reaction product of (A) from about 50% to about 65% by weight based upon the total weight of (A) and (B) of an epoxy resin ester of a partially conjugated unsaturated fatty acid and (B) from about 50% to about 35% by weight based upon the total weight of (A) and (B) of a blend of reactive monomers possessing reactive double bonds, at least one of which must be an unsaturated mono-basic acid in the presence of (II) an alcohol ether of a glycol and subsequently reacted with (III) an amine and then (IV) dispersed in water, wherein component (A) is the reaction product, 2,2,bis(4 hydroxy phenyl)dimethyl methane and epichlorohydrin, and has a melting point from about 130° F. to about 230° F. and an epoxide equivalent weight within the range from about 400 to about 1100, and the fatty acids used are straight chain monobasic acids of 18 carbon length having double bonds arranged in the chain in amount and position to give an iodine number of 125 to 185, an acid number of from about 180 to 210 and a percentage of conjugation of the double bonds between 20% and 25% wherein the reaction is carried out to an acid number below 10 and the monomer (B) portion consists of a mixture of 20–28% of unsaturated monobasic acids having a polymerizable double bond and 80% to 72% reactive monomers having a polymerizable double bond.

2. The water dilutible resin solution according to claim 1 wherein (A) the epoxy resin ester of a partially conjugated unsaturated fatty acid comprises the reaction product of an epoxy resin which is the reaction product of 2,2 bis(4-hydroxy phenyl)dimethyl methane and epichlorohydrin having an epoxide equivalent value ranging from about 450 to about 525 and at least one fatty acid having at least 18 carbon atoms in the chain, and an acid number ranging from about 190 to about 200 with an iodine number of about 125 to about 185.

3. The water dilutible resin according to claim 1 wherein (B) comprises a mixture of monomers comprising from about 20 to about 28 weight percent of an acid selected from a group consisting of methacrylic acid and acrylic and from about 80 to about 72 weight percent of at least one monomer selected from a group consisting of styrene, vinyl toluene and methacrylic acid esters and acrylic acid esters of alcohols selected from a group consisting of metyl, ethyl, propyl, butylisopropyl, isobutyl and 2-ethyl hexyl alcohol.

4. The water dilutible resin solution according to claim 1 wherein (II) is at least one member selected from a group consisting of the methyl, ethyl, propyl and butyl ether of a glycol selected from a group consisting of ethylene, propylene, diethylene and dipropylene glycol.

5. The water dilutible resin solution according to claim 1 wherein (III) the amine is at least one member selected from a group consisting of ammonia, triethyl amine, dimethyl ethanol amine, diethyl amine, monoisopropanol amine and monoethanol amine.

6. The water dilutible resin solution according to claim 1 wherein the ratio of (A) to (B) ranges from about 55 to about 65 percent by weight (A) and from about 35 to about 45 percent by weight (B) based upon the total weight of (A) and (B) used.

7. The water dilutible resin solution according to claim 2 wherein the ratio of fatty acids to epoxy resin ranges from about 40 to about 60 percent by weight fatty acids to about 60 to about 40 percent by weight epoxy resin.

8. The water dilutible resin solution according to claim 5 wherein the amount of amine used is sufficient to bring the pH of the resin solution within a range of from about 5 to about 9.

9. An air curable surface coating comprising (I) the reaction product of (A) from about 50% to about 65% by weight based upon the total weight of (A) and (B) of an epoxy resin ester of a partially conjugated unsaturated fatty acid and (B) from about 50% to about 35% by weight based upon the total weight of (A) and (B) of a blend of reactive monomer possessing reactive double bonds, at least one of which must be an unsaturated monobasic acid in the presence of (II) an alcohol ether of a glycol and subsequently reacted with (III) an amine and then (IV) dispersed in water, wherein component (A) is the reaction product of 2,2,bis(4 hydroxy phenyl)-dimethyl methane and epichlorohydrin, and has a melting point from about 130° F. to about 230° F. and an epoxide equivalent weight within the range from about 400 to about 1100, and the fatty acids used are straight chain monobasic acids of 18 carbon length having double bonds arranged in the chain in amount and position to give an iodine number of 125 to 185, an acid number of from about 180 to 210 and a percentage of conjugation of the double bonds between 20% and 25%, wherein the reaction is carried out to an acid number below 10 and the monomer (B) portion consists of a mixture of 20–18% of unsaturated monobasic acids having a polymerizable double bond and 80% to 72% reactive monomers having a polymerizable double bond.

10. An air curable surface coating comprising (I) the reaction product of (A) from about 50% to about 65% by weight based upon the weight of (A) and and (B) of an epoxy resin ester of a partially conjugated unsaturated fatty acid and (B) from about 50% to about 35% by weight based upon the weight of (A) and (B) a blend of reactive monomers possessing reactive double bonds, at least one of which must be an unsaturated monobasic acid in the presence of (II) an alcohol ether of a glycol and subsequently reacted with (III) an amine and then (IV) dispersed in water to which is added (V) fillers and (VI) pigments wherein component (A) is the reaction product of 2,2 bis(4 hydroxy phenyl)dimethyl methane and epichlorohydrin, and has a melting point from about 130° F. to about 230° F. and an epoxide equivalent weight within the range from about 400 to about 1100, and the fatty acids used are straight chain monobasic acids of 18 carbon length having double bonds arranged in the chain in amount and position to give an iodine number of 125 to 185, an acid number of from about 180 to 210 and a percentage of conjugation of the double bonds between 20% and 25% wherein the reaction is carried out to an acid number below 10 and the monomer (B) portion consists of a mixture of 20-28% of unsaturated monobasic acids having a polymerizable double bond and 80% to 72% reactive monomers having a polymerizable double bond.

11. The water dilutible surface coating according to claim 10 wherein (A) the epoxy resin ester of a partially conjugated unsaturated fatty acid comprises the reaction product of an epoxy resin which is the reaction product of 2,2 bis(4-hydroxy phenyl)dimethyl methane and epichlorohydrin having an epoxide equivalent value ranging from about 450 to about 525 and at least one fatty acid having at least 18 carbon atoms in the chain and an acid number ranging from about 190 to about 200 with an iodine number of about 125 to about 185.

12. The water dilutible surface coating according to claim 10 wherein (B) comprises a mixture of monomers comprising from about 20 to about 28 weight percent of an acid selected from a group consisting of methacrylic acid and acrylic acid and from about 80 to about 72 weight percent of at least one monomer selected from a group consisting of styrene, vinyl toluene and methacrylic acid esters and acrylic acid esters of alcohols selected from a group consisting of methyl, ethyl, propyl, butylisopropyl, isobutyl and 2-ethyl hexyl alcohol.

13. The water dilutible surface coating according to claim 10 wherein (II) is at least one member selected from a group consisting of the methyl, ethyl, propyl and butyl ether of a glycol selected from a group consisting of ethylene, propylene, diethylene and dipropylene glycol.

14. The water dilutible surface coating according to claim 10 wherein (III) the amine is at least one member selected from a group consisting of ammonia, triethyl amine, dimethyl ethanol amine, diethyl ethanol amine, monoisopropanol amine and monoethanol amine.

15. The water dilutible surface coating according to claim 10 wherein the ratio of (A) to (B) ranges from about 55 to about 65% by weight (A) and from about 35 to about 45% by weight (B) based upon the total weight of (A) and (B) used.

16. The water dilutible surface coating according to claim 10 wherein the ratio of fatty acids to epoxy resin ranges from about 40 to about 60% by weight fatty acids to about 60 to about 40% by weight epoxy resin.

17. The water dilutible surface coating according to claim 10 wherein the amount of amine used is sufficient to bring the pH of the resin solution within a range of from about 5 to about 9.

* * * * *